Figure 1:
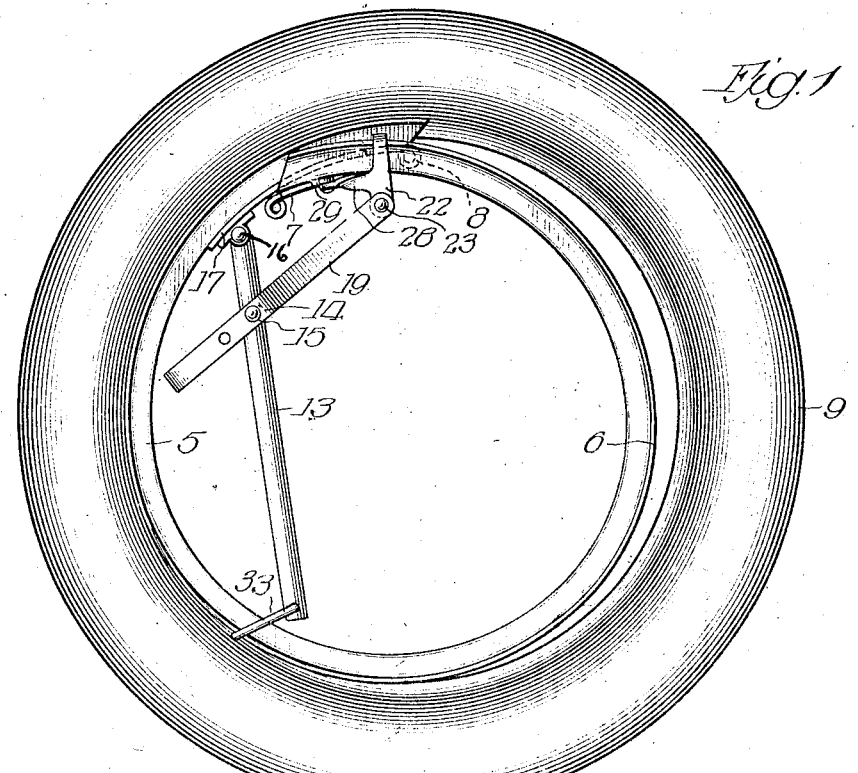

A. A. FRIESTEDT.
TIRE RIM CONTRACTOR.
APPLICATION FILED FEB. 23, 1915.

1,162,470.

Patented Nov. 30, 1915.

Witnesses:
G. S. Barrett
A. G. Latimer

Inventor:
Arthur A. Friestedt
By Pond & Wilson Attys

UNITED STATES PATENT OFFICE.

ARTHUR A. FRIESTEDT, OF CHICAGO, ILLINOIS.

TIRE-RIM CONTRACTOR.

1,162,470.　　　　Specification of Letters Patent.　　Patented Nov. 30, 1915.

Application filed February 23, 1915. Serial No. 9,898.

*To all whom it may concern:*

Be it known that I, ARTHUR A. FRIESTEDT, a citizen of the United States, residing at Chicago, in the county of Cook and State of Illinois, have invented certain new and useful Improvements in Tire-Rim Contractors, of which the following is a specification.

This invention relates to tire-rim contractors designed to be engaged with the opposing ends of a split demountable rim, and by means of which the ends of the rim may be moved past each other into overlapped relation to thereby reduce the diameter of the rim so that a tire can be readily removed from the rim and replaced thereon.

One of the primary objects of my present invention is to overcome the objections above mentioned and to provide a tool of this general character which will be adapted to rims of various widths and which can be quickly and easily attached to or placed in operative relation with respect to the rim without manipulating any clamps or clamping devices whatsoever.

Another object of my invention is to provide an implement of this character which will not rely upon friction or clamping operations to maintain it in required relation with the rim but which will be so constructed that it will engage with the respective members of the rim-lock, which members serve to prevent the implement from slipping on the rim when the implement is manipulated to overlap the rim-ends.

Another object of the invention is to provide an implement which can be readily applied to various types of demountable rims now on the market and which will not require adjustment in order to adapt it to the various types.

Still another object is to provide an implement which in addition to its function of contracting a rim is also capable of being used to preliminarily break the locking engagement or connections of the rim ends, or, in other words, to force one of the rim ends inwardly relatively to the other so that it may be moved past the other into overlapping position.

A further object is to provide an implement for the purposes above mentioned which will be simple in construction, light in weight, cheap to manufacture and capable of being folded into compact form, so as to take up but little storage space, and which will be strong, durable and very effective in operation.

To facilitate an understanding of my invention I have disclosed one prefererd embodiment thereof in the accompanying drawings, but it will be obvious that the structural features disclosed are capable of considerable variation and modification without departing from the spirit of the invention as defined in the appended claims.

Figure 2:
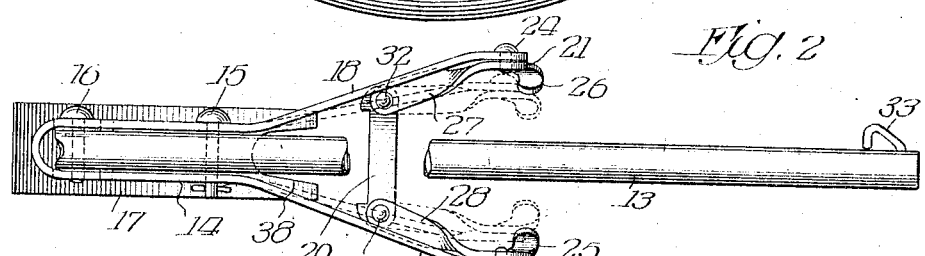
Figure 3:
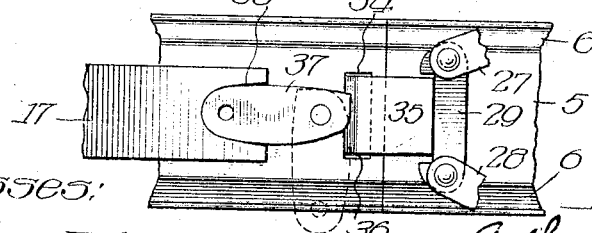

Referring to the drawings, Figure 1 is a side view of an implement embodying my invention, shown in operative position on a tire-rim; Fig. 2 is a plan view of the tool shown in Fig. 1, and Fig. 3 is a fragmentary view showing the application of my implement to another type of rim.

On the drawings and referring particularly to Fig. 1, reference character 5 designates generally a split rim of well known construction having straight side walls 6 and provided at its opposed ends with the locking members 7 and 8 by means of which the ends of the rim are locked together in operative position. In this type of rim the members 7 and 8 are in the form of plates provided at their ends with eyes which, when the rim is in normal position, are alined and locked together by a pin inserted through the eyes. Upon the rim is mounted the casing 9 equipped with an inner tube and a flap if desired to protect the inner tube from chafing and abrasion by the rim and the edges of the casing.

My improved implement, which is designed to reduce the diameter of the rim and thereby loosen the rim from the casing, consists primarily of a lever 13 which serves as an operating handle and a link 14 pivotally mounted on the lever 13 by a pin 15. Upon the end of the short arm of the lever 13 there is pivotally mounted by means of a fulcrum-pin 16 a shoe or plate 17, preferably curved to conform to the curvature of the inner face of the rim and constructed to abut against the outer end of the rim-locking member 8, as shown in Fig. 1, the shoe 17 being of the required length to space the fulcrum 16 of the lever the required distance from the joint of the rim.

The link 14 consists of a bar of springmetal shaped as shown in Fig. 2 to provide a pair of arms 18 and 19 which are spaced apart at their free ends a distance substantially equal to the average width of rim upon which the implement is to be used. A pair of hooked members 21 and 22 are pivotally mounted upon studs 23 and 24 at the ends of the respective arms, the members being shaped at their ends to provide hooks 25 and 26, respectively, adapted to be engaged with the flanges 6 of the tire-rim, as shown in Fig. 1. The hooked members 21 and 22 are also constructed to provide rearwardly and inwardly projecting arms 27 and 28 which are twisted so that their ends are disposed in a common plane and are pivotally connected together by a thrust member in the form of a bar 29 and the pivot pins 31 and 32. It will thus be obvious that the hooked members are flexibly connected together so that they may be moved apart or moved toward each other to accommodate them to rims of various widths, the adjusting movements of the hooked members being permitted by the flexibility of the arms 18 and 19 and the pivotal connection through the bar 29. The bar is preferably recessed on its forward edge as shown in Fig. 2 and is adapted to abut against the opposed outer end of the rim-locking member 7, as shown in Fig. 1.

When it is desired to contract a rim the hooked members 21 and 22 are positioned to straddle the rim and the hooks 25 and 26 are first hooked under the flanges of the rim end which is to be pulled inwardly, with the bar 29 disposed against the inner face of the other end of the rim. The long end of the shoe 17 is moved into abutting engagement with the bar 29 by swinging the handle upon pin 15 as a fulcrum, whereupon the handle is swung in a clockwise direction, viewing Fig. 1. The bell crank members 21 and 22 will swing inwardly about the bar 29 which fulcrums against the end of the shoe 17 with the result that the hooks will be drawn inwardly to break the connection between the rim ends and dispose one rim end inside the other. After the connection between the rim ends has been broken the hooks are slid backwardly on the rim until the bar 29 is disposed behind and in engagement with the opposed end of the locking member 7. The shoe 17 is then placed against the end of the locking member 8 whereupon the handle 13 is swung in a clockwise direction upon its fulcrum 16, bringing the bar 29 firmly against the locking member 7, which prevents further relative movement between the rim and the hooked members. Continued movement of the lever will pull the end of the rim, which is engaged by the hooked members, toward the lever 13 until the rim ends are brought into the overlapped position shown in Fig. 1, whereupon the rim is locked in its contracted position by a hook 33 carried by the outer end of the lever 13 and adapted to hook over one of the rim flanges. It will thus be obvious that slippage of the implement on the rim is prevented by the locking members 7 and 8 and that no clamping of the implement to the rim is required. The hooked members 21 and 22 are employed merely to hold the bar 29 in proper position with respect to the locking member 7 and they neither grip nor clamp the rim, as has been the practice with implements of this general character heretofore employed. In Fig. 2 the hooked members are shown in full lines as positioned for a rim of a certain width and in dotted lines as positioned for engagement with a narrower rim, these variations in the position of the hooked members being permitted, as previously explained, by the flexibility of the arms 18 and 19 and the pivotal connection between the members.

In the type of rim disclosed in Fig. 3 one meeting end of the rim 5 is formed with a rectangular slot 34 and the opposite meeting end of the rim has secured thereto a tongue or hasp 35 provided with an inwardly offset end 36 adapted, when the meeting ends are brought together, to enter the slot 34 and be locked therein by a pivoted latch 37. In order to adapt my improved implement to rims of this type the operating end of the shoe 17 is provided with a slot or recess adapted to fit around the end of the latch 37. This shoe may be employed as a wrench to move the latch 37 on its pivot from locked to unlocked position, and vice versa. When applying the tool to this type of rim the latch 37 is first swung from locked position to the unlocked position shown in dotted lines in Fig. 4, whereupon the tongue or hasp 35 is lifted out of the slot 34 to break the connection between the rim ends by manipulation of the implement to the connection, as previously described. The latch is then turned back to locked position, shown in full lines, and the shoe 17 is engaged therewith whereupon the bar 29 is engaged behind the hasp 35, all as shown in Fig. 3. Upon manipulation of the lever 13 the ends of the rim will be moved past each other into the overlapped position shown in Fig. 1 in the manner previously explained. Manifestly the end of the rim which is drawn inwardly and overlapped over the other end will prevent accidental displacement of the shoe from operative position.

It should be obvious from the foregoing that my tire-rim contractor is capable of use on various types of rims now on the market and that it can be quickly and easily applied to any rim without manipulating any screws or other clamping devices, and that it is properly and securely held in cooperative relation with the rim without distorting or defacing the rim, as is done by clamping devices heretofore employed.

It is believed that the construction of one preferred embodiment of my invention and its mode of operation will be fully understood from the foregoing without further description and that minor variations in the structural details disclosed will be appreciated as coming within the scope of my invention, as set forth in the following claims.

I claim:

1. A tire rim contractor comprising a lever, a link pivoted thereto, means carried by said link for connecting the link with one end of a split tire rim, and a shoe pivoted to the end of said lever and extending therefrom in the general direction of said link, said shoe being shaped and proportioned to engage with the rim locking member on one end of the rim and to permit the other end of said rim which is connected with the link to be drawn over said shoe into over-lapped position when the lever is swung about its pivotal connection with the shoe.

2. A tire rim contractor comprising a lever, a link pivoted thereto, means carried by said link for connecting the link with one end of a split tire rim, and a shoe pivoted to the end of said lever and extending therefrom in the general direction of said link, said shoe being provided with an open-ended slot adapted for a wrench engagement with the pivotal member of a rim lock and so shaped and proportioned as to permit the opposed end of a rim to be drawn over said shoe into overlapped position upon manipulation of said lever.

3. A tire rim contractor comprising a lever, a link pivoted thereto, means carried by said link for connecting the link with one end of a split tire rim, said means including a pair of hooks adapted to engage the flanges of a rim and an abutment bar pivotally connecting said hooks, and a shoe pivotally mounted on the end of said lever and extending toward said abutment bar in position to be engaged thereby and form a fulcrum about which the hooks will tilt to break the rim lock upon swinging movement of said lever.

4. A tire rim contractor comprising a lever, a link pivoted thereto comprising a pair of bifurcated arms, a rim flange engaging hook pivotally mounted at the end of each arm, an abutment bar pivotally connecting said hooks in position to overlie the inner face of a rim flange and extend transversely thereof, and a shoe pivotally mounted on the end of said lever and extending in the direction of said arms, said shoe being constructed and proportioned to engage said abutment bar so that the rim lock may be broken upon manipulation of the lever and to engage with one of the rim-locking members so that the rim may be overlapped by manipulation of the lever.

5. A tire-rim contractor, comprising a pair of bell-crank-shaped members, one arm of each being provided with a hook, a bar pivotally connecting the other arms of said members, link arms upon which said members are pivotally mounted, a lever connected to said links, and a rim-engaging device carried by said lever.

6. A tire-rim contractor, comprising a lever, a rim-lock-engaging device pivotally mounted on one end of said lever, a pair of link arms carried by the lever, a rim-lock-engaging device carried by the free ends of said links, and a rim-flange-engaging hook carried by the other end of said lever whereby the rim is locked in contracted position.

ARTHUR A. FRIESTEDT.

Witnesses:
 IRA J. WILSON,
 A. G. LATIMER.